United States Patent
Tang (10) Patent No.: US 11,244,672 B2
(45) Date of Patent: Feb. 8, 2022

(54) SPEECH RECOGNITION METHOD AND APPARATUS, AND STORAGE MEDIUM

(71) Applicant: TENCENT TECHNOLOGY (SHENZHEN) COMPANY LIMITED, Shenzhen (CN)

(72) Inventor: Huizhong Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 200 days.

(21) Appl. No.: 16/743,150

(22) Filed: Jan. 15, 2020

(65) Prior Publication Data

US 2020/0152177 A1 May 14, 2020

Related U.S. Application Data

(63) Continuation of application No. PCT/CN2018/091926, filed on Jun. 20, 2018.

(30) Foreign Application Priority Data

Jul. 19, 2017 (CN) .......................... 201710588382.8

(51) Int. Cl.
*G10L 15/08* (2006.01)
*G10L 15/02* (2006.01)
(Continued)

(52) U.S. Cl.
CPC ............ *G10L 15/083* (2013.01); *G10L 15/02* (2013.01); *G10L 15/1815* (2013.01); *G10L 15/22* (2013.01); *G10L 2015/223* (2013.01)

(58) Field of Classification Search
CPC ......... G10L 15/08; G10L 15/00; G10L 15/01; G10L 15/16; G10L 15/18; G10L 15/187;
(Continued)

(56) References Cited

U.S. PATENT DOCUMENTS

| 2013/0289994 A1 | 10/2013 | Newman et al. |
| 2014/0163978 A1 | 6/2014 | Basye et al. |

(Continued)

FOREIGN PATENT DOCUMENTS

| CN | 102866921 A | 1/2013 |
| CN | 104866274 A | 8/2015 |

(Continued)

OTHER PUBLICATIONS

The State Intellectual Property Office of the People's Republic of China (SIPO) Office Action 1 for 201710588382.8 dated Nov. 8, 2020 15 Pages (including translation).

(Continued)

*Primary Examiner* — Qi Han
(74) *Attorney, Agent, or Firm* — Anova Law Group, PLLC (57) ABSTRACT

A speech recognition method and apparatus, and a storage medium are provided. The method includes: acquiring, by a digital signal processor (DSP), audio data; performing, by the DSP, fuzzy speech recognition on the audio data; waking up a central processing unit (CPU) in a dormant state if a fuzzy speech recognition result indicates that that a wakeup word exists in the audio data. The method also includes: reading, by the CPU, data corresponding to the wakeup word in the audio data from the DSP, to obtain wakeup data; determining, by the CPU, whether the wakeup word exists in the audio data by performing speech recognition on the wakeup data; if the wakeup word exists, performing, by the CPU, semantic analysis on the audio data; and if the wakeup word does not exist, determining, by the CPU, that the fuzzy speech recognition result is incorrect and entering the dormant state.

20 Claims, 6 Drawing Sheets

(51) Int. Cl.
*G10L 15/18* (2013.01)
*G10L 15/22* (2006.01)

(58) Field of Classification Search
CPC ....... G10L 15/19; G10L 15/197; G10L 15/20; G10L 15/22; G10L 15/26; G10L 2015/0631; G10L 2015/0636; G10L 2015/0638; G10L 2015/223–228
USPC ........ 704/231–233, 245–247, 250, 251, 255, 704/257, 270.1, 275
See application file for complete search history.

(56) References Cited

U.S. PATENT DOCUMENTS

| | | | |
|---|---|---|---|
| 2015/0113536 A1 | 4/2015 | Liu et al. | |
| 2015/0221307 A1 | 8/2015 | Shah et al. | |
| 2016/0148615 A1 | 5/2016 | Lee et al. | |
| 2016/0240196 A1 | 8/2016 | Yamashita | |
| 2016/0253997 A1* | 9/2016 | Kerr | G10L 15/28 381/110 |
| 2018/0108359 A9* | 4/2018 | Gunn | G06F 1/3265 |
| 2018/0293974 A1* | 10/2018 | Georges | G10L 15/183 |

FOREIGN PATENT DOCUMENTS

| | | |
|---|---|---|
| CN | 105575395 A | 5/2016 |
| CN | 105632491 A | 6/2016 |
| CN | 105723451 A | 6/2016 |
| CN | 106020987 A | 10/2016 |
| CN | 106356059 A | 1/2017 |
| CN | 107360327 A | 11/2017 |
| JP | H0476678 A | 3/1992 |
| JP | H06149286 A | 5/1994 |
| JP | 2004045900 A | 2/2004 |
| JP | 2015520409 A | 7/2015 |
| JP | 2016505888 A | 2/2016 |
| JP | 2016151608 A | 8/2016 |

OTHER PUBLICATIONS

Yueli Rong, "The fuzzy matching method of binary time-frequency graph for speech recognition," Applied Acoustics, Oct. 15, 1994 (Oct. 15, 1994), pp. 37-41. 6 pages.

The Japan Patent Office (JPO) Notification of Reasons for Refusal for Application No. 2020-502569 and Translation dated Dec. 25, 2020 8 pages.

Peiling Zhang et al., MDSR Based on Fuzzy Clustering Neural Network, 2010 International Conference on Intelligent Computation Technology and Automation, IEEE, Jul. 26, 2010 (Jul. 26, 2010), pp. 636-639. 5 pages.

The World Intellectual Property Organization (WIPO) International Search Report for PCT/CN2018/091926 dated Sep. 4, 2018 5 Pages (including translation).

Yuhong Liu et al., "Speech Recognition Based on Fuzzy Clustering Neural Network", Chinese Journal of Computers, vol. 29, No. 10, Oct. 30, 2006, ISSN: 0254-4164, pp. 1894-1900 7 Pages.

* cited by examiner

SPEECH RECOGNITION METHOD AND APPARATUS, AND STORAGE MEDIUM

CROSS-REFERENCES TO RELATED APPLICATIONS

This application is a continuation application of PCT Patent Application No. PCT/CN2018/091926, filed on Jun. 20, 2018, which claims priority to Chinese Patent Application No. 201710588382.8, filed with the Chinese Patent Office on Jul. 19, 2017 and entitled "SPEECH RECOGNITION METHOD AND APPARATUS, AND STORAGE MEDIUM", the entire contents of both of which are incorporated herein by reference.

FIELD OF TECHNOLOGY

The present disclosure relates to the field of communications technologies, and specifically, to speech recognition.

BACKGROUND OF THE DISCLOSURE

With development of artificial intelligence, intelligent hardware products have also developed rapidly. An intelligent hardware product refers to a hardware device that integrates artificial intelligence functions, for example, an intelligent mobile terminal (briefly referred to as a mobile terminal). The essential functions of the intelligent hardware product often require user interaction. Speech interaction, as a natural interaction manner with low learning costs, has become a mainstream technology of the intelligent hardware product.

In speech interaction, wakeup word speech recognition is an important issue. Taking a mobile terminal as an example, in the existing technology, to quickly wakeup the mobile terminal, a sound recording function of the terminal needs to be always enabled, and the central processing unit (CPU) can process audio data at any time. The CPU cannot enter a dormant state even when the user is not speaking. This scheme imposes a high requirement on the specification of the CPU because the CPU needs to encode, decode, and play various audio data and implement various other functions. Moreover, power consumption of the entire system is high, which greatly shortens the standby time of a battery-powered mobile terminal. Some existing technologies provide an external power supply or a physical key dedicated to wake up the terminal. However, the use of an external power supply inevitably affects the mobility of the mobile terminal. If wakeup is implemented by using a physical key, the speech wakeup cannot be implemented. In other words, in the conventional scheme, if the mobility and the speech wakeup function of the mobile terminal need to be maintained, a lot of battery power needs to be consumed, which greatly reduces the standby time of the mobile terminal and affects the performance of the mobile terminal.

SUMMARY

Embodiments of the present disclosure provide a speech recognition method and apparatus, and a storage medium.

According to a first aspect, an embodiment of the present disclosure provides a speech recognition method. The method includes: acquiring, by a digital signal processor (DSP) of a computing device, audio data; performing, by the DSP, fuzzy speech recognition on the audio data; waking up, by the DSP, a central processing unit (CPU) of the computing device in a dormant state upon determining that a wakeup word exists in the audio data based on a fuzzy speech recognition result. The method also includes: reading, by the CPU, data corresponding to the wakeup word in the audio data from the DSP, to obtain wakeup data; determining, by the CPU, whether the wakeup word exists in the audio data by performing speech recognition on the wakeup data; upon determining that the wakeup word exists, performing, by the CPU, semantic analysis on the audio data; and upon determining that the wakeup word does not exist, determining, by the CPU, that the fuzzy speech recognition result is incorrect and entering the dormant state.

According to a second aspect, an embodiment of the present disclosure provides a speech recognition apparatus, including a digital signal processor (DSP); and a central processing unit (CPU). The DSP is configured to: acquire audio data; perform fuzzy speech recognition on the audio data; and wake up the CPU in a dormant state upon determining that a wakeup word exists in the audio data based on a fuzzy speech recognition result. The CPU is configured to: read data corresponding to the wakeup word in the audio data from the DSP, to obtain wakeup data; determine whether the wakeup word exists in the audio data by performing speech recognition on the wakeup data; upon determining that the wakeup word exists, perform semantic analysis on the audio data; and upon determining that the wakeup word does not exist, determine that the fuzzy speech recognition result is incorrect and enter the dormant state.

According to a third aspect, an embodiment of the present disclosure further provides a non-transitory computer readable storage medium. The storage medium stores a plurality of instructions. The instructions, when being executed by one or more processors of a computing device, cause the one or more processors to perform: acquiring, by a digital signal processor (DSP) of a computing device, audio data; performing, by the DSP, fuzzy speech recognition on the audio data; waking up, by the DSP, a central processing unit (CPU) of the computing device in a dormant state upon determining that a wakeup word exists in the audio data based on a fuzzy speech recognition result. The instructions further cause the CPU to: read data corresponding to the wakeup word in the audio data from the DSP, to obtain wakeup data; determine whether the wakeup word exists in the audio data by performing speech recognition on the wakeup data; upon determining that the wakeup word exists, perform semantic analysis on the audio data; and upon determining that the wakeup word does not exist, determine that the fuzzy speech recognition result is incorrect and enter the dormant state.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all the embodiments of the present disclosure. All other embodiments obtained by persons skilled in the art based on the embodiments of the present disclosure without creative efforts shall fall within the protection scope of the present disclosure.

Embodiments of the present disclosure provide a speech recognition method and apparatus, and a storage medium.

The speech recognition apparatus may be specifically integrated in a mobile terminal, for example, a device such as a mobile phone, a wearable intelligent device, a tablet computer, and/or a notebook computer.

Figure 1A:
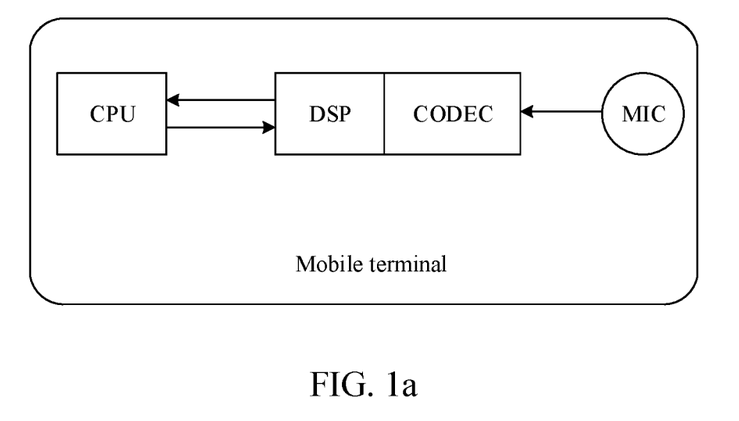
FIG. 1a is an architectural diagram of a mobile terminal according to an embodiment of the present disclosure.
Figure 1B:
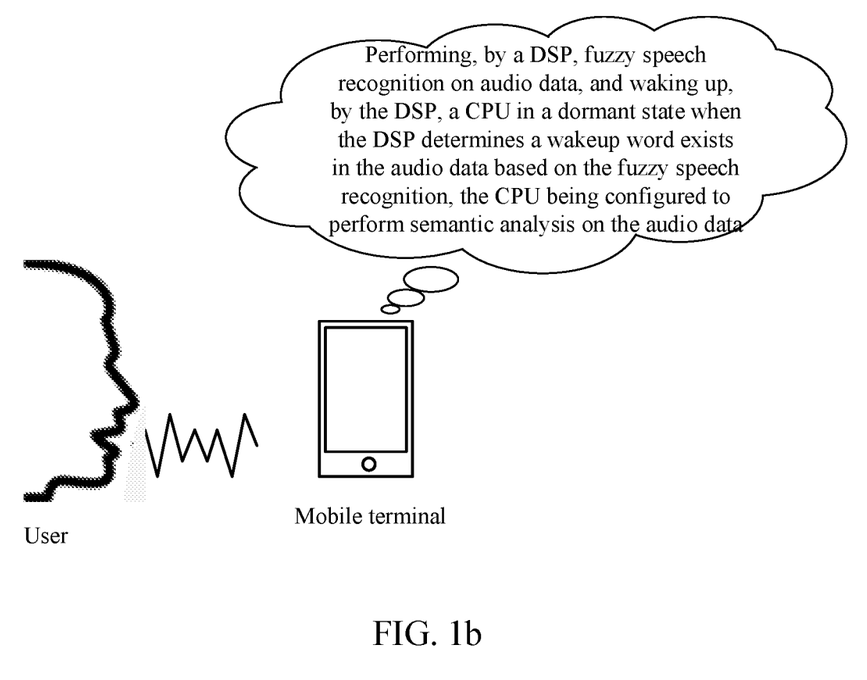
FIG. 1b is a schematic diagram of a scenario of a speech recognition method according to an embodiment of the present disclosure.

For example, that the speech recognition apparatus is integrated in the mobile terminal is taken as an example. With reference to FIG. 1a, a digital signal processor (DSP) may be disposed in the mobile terminal. For example, the DSP may be disposed in a coder-decoder (Codec) (for example, a coder-decoder with a DSP function). In this way, after the mobile terminal acquires audio data, for example, receives, by using a microphone (MIC), a sound made by a user, fuzzy speech recognition may be performed on the audio data by using the DSP. For example, with reference to FIG. 1b, when a fuzzy speech recognition result indicates that a wakeup word exists, a CPU in a dormant state is woken up by the DSP. The CPU may be configured to perform semantic analysis on the audio data. Otherwise, when a fuzzy speech recognition result indicates that the wakeup word does not exist, the CPU is not woken up, and the DSP continues monitoring the audio data.

The DSP is a microprocessor especially suitable for performing digital signal processing calculation, and can quickly implement various digital signal processing algorithms in real time. Moreover, the DSP has a characteristic of being supported by hardware performing loop and jump at low overheads or zero overhead, so that compared with other processors, power consumption of the DSP is lower. In addition, the DSP also has a noise reduction function.

Details are separately described below.

In one embodiment, a description is provided from a perspective of a speech recognition apparatus. The speech recognition apparatus may be specifically integrated in a device such as a mobile terminal. The mobile terminal may include a device such as a mobile phone, a wearable intelligent device, a tablet computer, and/or a notebook computer. The device may include at least two processors, one being a DSP with low power consumption and low computation capability and the other being a CPU with high power consumption and high computation capability.

One embodiment provides a speech recognition method, including: acquiring audio data; performing fuzzy speech recognition on the audio data by using a DSP; and waking, by the DSP, a CPU in a dormant state up when a fuzzy speech recognition result indicates that a wakeup word exists, the CPU being configured to perform semantic analysis on the audio data.

Figure 1C:
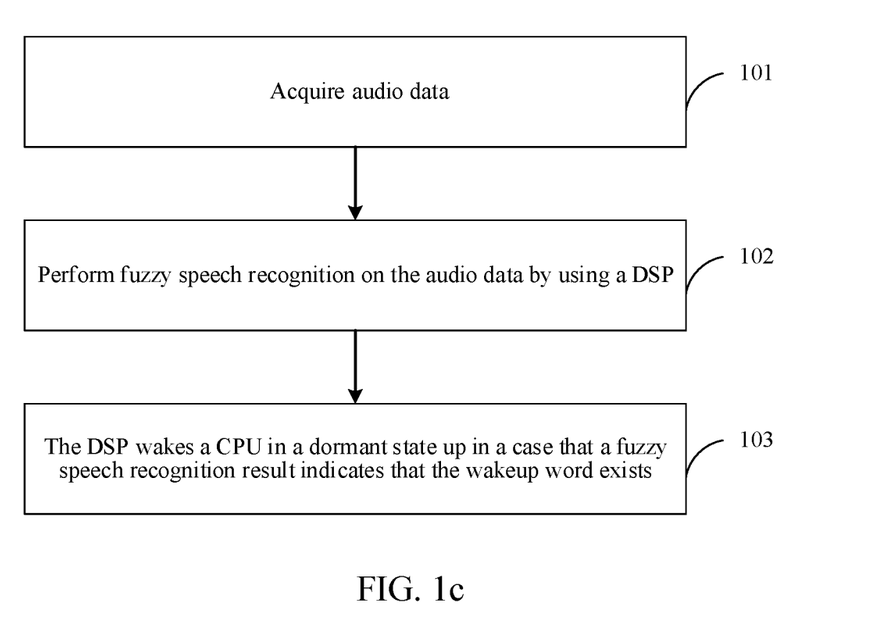
FIG. 1c is a flowchart of a speech recognition method according to an embodiment of the present disclosure.

As shown in FIG. 1c, a specific process of the speech recognition method may be as follows:

101. Acquire audio data.

For example, specifically, the audio data may be collected by using an MIC, such as an MIC module built in the mobile terminal.

The audio data may include data into which various types of sounds are converted.

Categories of the sounds may be not limited. For example, the sounds may be speaking sounds, sounds made by animals, sounds made by striking objects, and/or music.

102. Perform fuzzy speech recognition on the audio data by using a DSP.

There may be a plurality of fuzzy speech recognition manners. For example, fuzzy clustering analysis may be used for performing speech recognition on the audio data. Alternatively, a fuzzy matching algorithm may be used for performing speech recognition on the audio data. That is, the operation of "performing fuzzy speech recognition on the audio data by using the DSP" may be specifically as follows:

(1) Perform, by using the DSP, speech recognition on the audio data through fuzzy clustering analysis, to obtain the fuzzy speech recognition result.

For example, specifically, a fuzzy clustering neural network may be established according to the fuzzy clustering analysis. The fuzzy clustering neural network is taken as an estimator of a probability density function, to predict a probability of the audio data including the wakeup word. When the predicted probability is greater than or equal to (i.e., when a prediction result indicates that the probability is greater than or equal to a set value), a fuzzy speech recognition result indicating that the wakeup word exists is generated. Otherwise, when the predicted probability is less than the set value, a fuzzy speech recognition result indicating that the wakeup word does not exist is generated.

The fuzzy clustering analysis generally means that a fuzzy matrix is constructed according to properties of a research object, and on the basis of the fuzzy matrix, a clustering relationship is determined according to a certain membership. That is, a fuzzy relationship between samples is quantitatively determined through a method of fuzzy mathematics, so that clustering is performed objectively and accurately. The clustering is to divide a data set into a plurality of classes or clusters, to make a difference between data in various classes as large as possible, and a difference between data in a class as small as possible.

The set value may be set according to an actual application requirement, and details are not described herein.

(2) Perform, by using the DSP, speech recognition on the audio data through a fuzzy matching algorithm, to obtain the fuzzy speech recognition result.

For example, specifically, a feature map of a pronunciation of the wakeup word may be acquired, to obtain a standard feature map. A feature map of a pronunciation of each word in the audio data is analyzed, to obtain a to-be-matched feature map. Then, an extent to which each to-be-matched feature map belongs to the standard feature map is calculated according to a preset membership function. When the extent is greater than or equal to a preset value, a fuzzy speech recognition result indicating that the wakeup word exists is generated. Otherwise, when the extent is less than the preset value, a fuzzy speech recognition result indicating that the wakeup word does not exist is generated.

The membership function and the preset value may be set according to an actual application requirement, and details are not described herein.

Figure 1D:
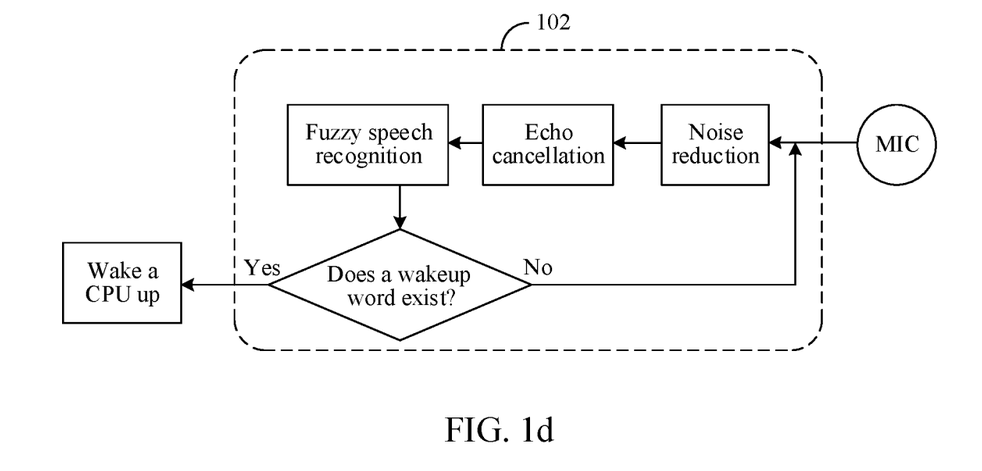
FIG. 1d is a block diagram of a speech recognition method according to an embodiment of the present disclosure.

Optionally, to improve accuracy of the speech recognition, before the fuzzy speech recognition is performed on the audio data by using the DSP, filtering such as noise reduction and/or echo cancellation may be further performed on the audio data. That is, as shown in FIG. 1d, before the operation of "performing fuzzy speech recognition on the audio data by using a DSP", the speech recognition method may further include:

performing noise reduction and/or echo cancellation processing on the audio data, to obtain processed audio data.

In this case, the operation of "performing fuzzy speech recognition on the audio data by using a DSP" may be specifically: performing the fuzzy speech recognition on the processed audio data by using the DSP.

103. The DSP wakes a CPU in a dormant state up when a fuzzy speech recognition result indicates that the wakeup word exists. That is, a running program of the CPU is activated by the DSP. For example, specifically, a related running program specific to recording and the audio data in the CPU may be activated.

There may be one or more wakeup words. The wakeup word may be specifically set according to an actual application requirement in advance. For example, that the wakeup word includes "make a call" and "send a message" is taken as an example. When a fuzzy speech recognition result indicates that the word "make a call" or "send a message" exists in the audio data, the CPU may be woken up by the DSP. The rest can be deduced by analogy.

After the operation of "waking, by the DSP, a CPU in a dormant state up", the speech recognition method may further include:

performing the semantic analysis on the audio data by using the CPU, and executing a corresponding operation according to an analysis result of the semantic analysis.

For example, specifically, an operation object and operation content may be determined according to the analysis result. Then, the operation content is executed on the operation object.

Resources of the DSP are limited, and accuracy of the speech recognition is not high. Therefore, to further improve the accuracy of the recognition and avoid a case that the CPU is wrongly woken up, optionally, before the CPU performs the semantic analysis on the audio data, the audio data may be further recognized by the CPU. That is, before the operation of "performing the semantic analysis on the audio data by using the CPU", the speech recognition method may further include:

reading, from the DSP, data including the wakeup word in the audio data, to obtain wakeup data; performing speech recognition on the wakeup data by using the CPU; and executing, when a speech recognition result generated by the CPU indicates that the wakeup word exists in the audio data, the operation of performing the semantic analysis on the audio data by using the CPU; otherwise, the speech recognition result indicates that the wakeup word does not exist in the audio data, determining that the fuzzy speech recognition result is incorrect and setting the CPU to be dormant (i.e., the CPU enters into the dormant state), and returning to execute the operation of obtaining the audio data (that is, operation 101).

Optionally, to reduce power consumption, when the CPU is woken up, not all cores may be opened, and calculation processing is performed by using a single core in low frequency. That is, the operation of "performing speech recognition on the wakeup data by using the CPU" may include:

setting a working state of the CPU to be single-core and low-frequency, to enable the CPU to perform the speech recognition on the wakeup data in the working state.

For ease of description, in one embodiment of the present disclosure, the working state that is "operating with single-core and at low-frequency" is referred to as a first state. That is, the CPU may perform the speech recognition on the wakeup data in the first state. Operating frequency of a CPU, or frequency of a CPU, as used herein, may refer to a clock rate of the CPU, e.g., how many times the internal clock inside the CPU ticks in cycles per second.

Optionally, to improve processing efficiency, when determining that the wakeup word exists, the CPU may increase a quantity of cores, and increase operating frequency to perform the semantic analysis on the audio data. That is, the operation of "performing the semantic analysis on the audio data by using the CPU" may include:

setting the working state of the CPU to be multi-core and high-frequency, and performing, by the CPU, the semantic analysis on the audio data in the working state.

For ease of description, in one embodiment of the present disclosure, the working state that is "operating with multi-core and at high-frequency" is referred to as a second state. That is, the working state of the CPU may be set to the second state, and the CPU may perform the semantic analysis on the audio data in the second state. That is, in an exemplary embodiment, the number of CPU cores in operation at the second state is more than the number of CPU cores in operation at the first state; and the operating frequency of the CPU at the second state is higher than the operating frequency of the CPU at the first state.

In one embodiment of the present disclosure, multiple cores mean that two or more complete computing engines (cores) integrated in a processor are used. Low frequency means that the operating frequency is lower than preset frequency. High frequency means that the operating frequency is higher than or equal to the preset frequency. The preset frequency may be determined according to an actual application requirement, and details are not described herein.

Optionally, to improve flexibility of processing and better balance power consumption and processing efficiency, a quantity of working cores and a magnitude of operating frequency of the CPU may be further adjusted according to a specific speech scene. That is, the operation of "performing the semantic analysis on the audio data by using the CPU" may include:

determining a semantic scene according to the wakeup word corresponding to the audio data; determining the quantity of working cores and a magnitude of operating frequency of the CPU according to the semantic scene; setting the working state of the CPU according to the quantity of working cores and the magnitude of the operating frequency, to obtain a third state; and performing the semantic analysis on the audio data in the third state.

For example, in a semantic scene of "making a call", the semantic analysis may be performed on the audio data by using fewer working cores and lower operating frequency. In a semantic scene of "search", the semantic analysis may be performed on the audio data by using more working cores and higher operating frequency.

It can be known from the above that in one embodiment, after the audio data is acquired, the fuzzy speech recognition may be performed on the audio data by using the DSP. Only when it is determined that the wakeup word exists, the CPU in the dormant state is woken up by the DSP, and the CPU may be configured to perform the semantic analysis on the audio data. In the scheme, the DSP with relatively low operating power consumption replaces the CPU with relatively high operating power consumption to monitor the audio data. Therefore, the CPU does not need to be always in a woken-up state, but may be in the dormant state, and is only woken up if necessary. Therefore, compared with the conventional scheme that wakeup can only be implemented by using an external power supply or a physical key, system power consumption may be greatly reduced while maintaining mobility and the speech wakeup function in the scheme, thereby prolonging the standby time of a mobile terminal and improving the performance of the mobile terminal.

According to the method described above,
in one embodiment, a description is made by using an example in which the speech recognition apparatus is specifically integrated in a mobile terminal.

Figure 2A:
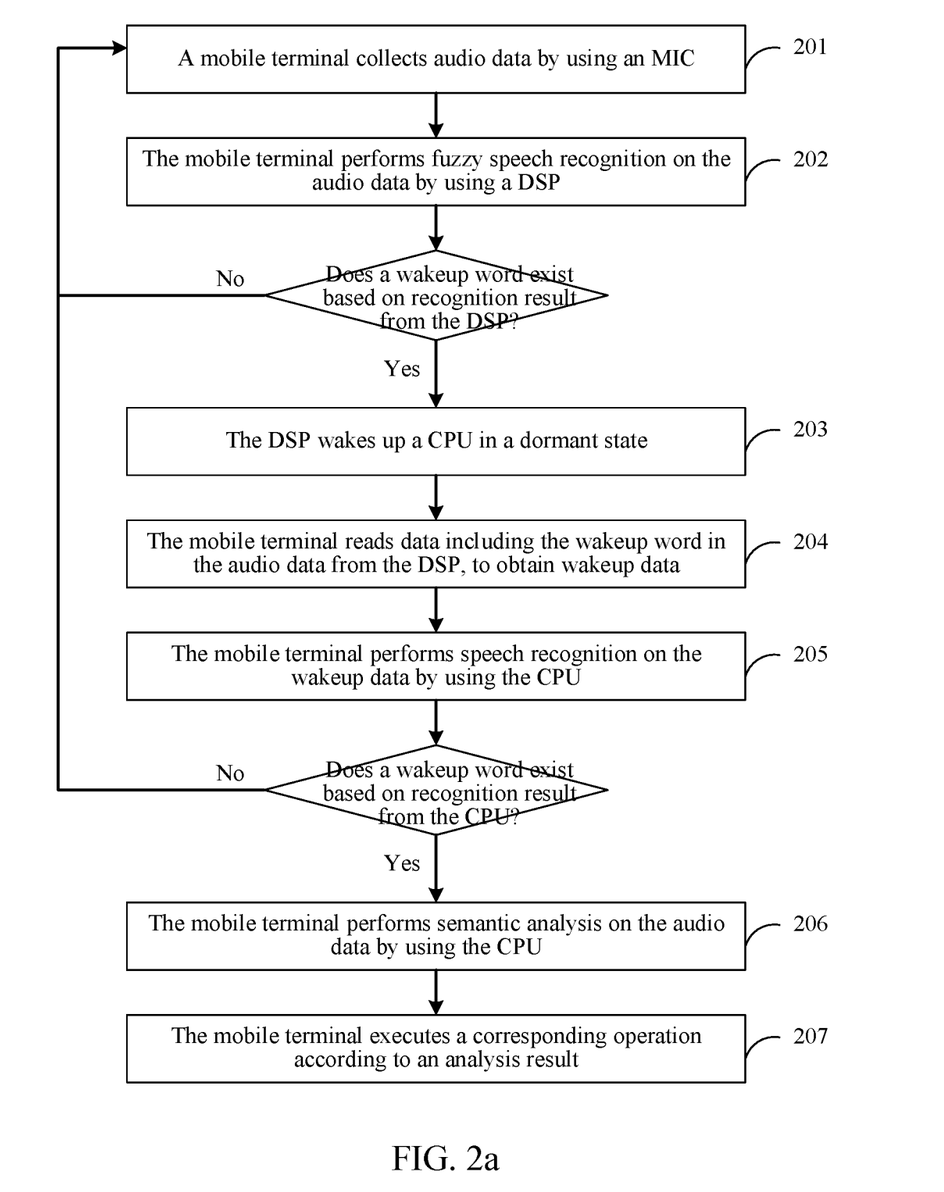
FIG. 2a is another flowchart of a speech recognition method according to an embodiment of the present disclosure.

As shown in FIG. 2a, a specific process of a speech recognition method may be as follows:

201. A mobile terminal collects audio data by using an MIC.

The MIC may be independent of the mobile terminal, or may be built in the mobile terminal. The audio data may include data into which various types of sounds are converted. Categories of the sounds may be not limited. For example, the sounds may be speaking sounds, sounds made by animals, sounds made by striking objects, and/or music.

202. The mobile terminal performs fuzzy speech recognition on the audio data by using a DSP, where when a fuzzy speech recognition result indicates that a wakeup word exists, operation 203 is executed; otherwise, when a fuzzy speech recognition result indicates that the wakeup word does not exist, operation 201 is returned to and executed.

There may be one or more wakeup words. The wakeup word may be specifically set according to an actual application requirement in advance. For example, the wakeup word may be "make a call", "send a message", "who is *", and/or "what is *", where "*" may be any noun, such as "who is Zhang San", "who is Li Si", or "what is Java". The rest can be deduced by analogy.

For example, as shown in FIG. 1a, the DSP may be set in a coder-decoder (that is, a Codec) of the mobile terminal. The coder-decoder can compress and decompress (that is, code and decode) audio data. After collecting audio data, the MIC transmits the audio data to the coder-decoder for processing, such as compressing and/or decompressing, and then transmitted to the DSP for performing the fuzzy speech recognition. There may be a plurality of fuzzy speech recognition manners. For example, fuzzy clustering analysis may be used for performing speech recognition on the audio data. Alternatively, a fuzzy matching algorithm may be used for performing speech recognition on the audio data. For example, details may be as follows:

(1) The mobile terminal performs, by using the DSP, speech recognition on the audio data through fuzzy clustering analysis, to obtain the fuzzy speech recognition result.

For example, the DSP may specifically establish a fuzzy clustering neural network according to the fuzzy clustering analysis; then predict, by taking the fuzzy clustering neural network as an estimator of a probability density function, a probability that the audio data includes the wakeup word; and generate a fuzzy speech recognition result indicating that the wakeup word exists when a prediction result indicates that the probability is greater than or equal to a set value; otherwise, generate a fuzzy speech recognition result indicating that the wakeup word does not exist when the prediction result indicates that the probability is less than the set value.

The set value may be set according to an actual application requirement, and details are not described herein.

(2) The mobile terminal performs, by using the DSP, speech recognition on the audio data through a fuzzy matching algorithm, to obtain the fuzzy speech recognition result.

For example, the DSP may specifically acquire a feature map of a pronunciation of the wakeup word, to obtain a standard feature map; analyze a feature map of a pronunciation of each word in the audio data, to obtain a to-be-matched feature map; then calculate an extent to which each to-be-matched feature map belongs to the standard feature map according to a preset membership function; and generate a fuzzy speech recognition result indicating that the wakeup word exists when the extent is greater than or equal to a preset value; otherwise, generate a fuzzy speech recognition result indicating that the wakeup word does not exist when the extent is less than a preset value.

The membership function and the preset value may be set according to an actual application requirement. In addition, the extent to which the to-be-matched feature map belongs to the standard feature map may be expressed by using a membership. A membership closer to 1 indicates a higher extent to which the to-be-matched feature map belongs to the standard feature map. A membership closer to 0 indicates a lower extent to which the to-be-matched feature map belongs to the standard feature map. Details are not described herein.

Figure 2B:
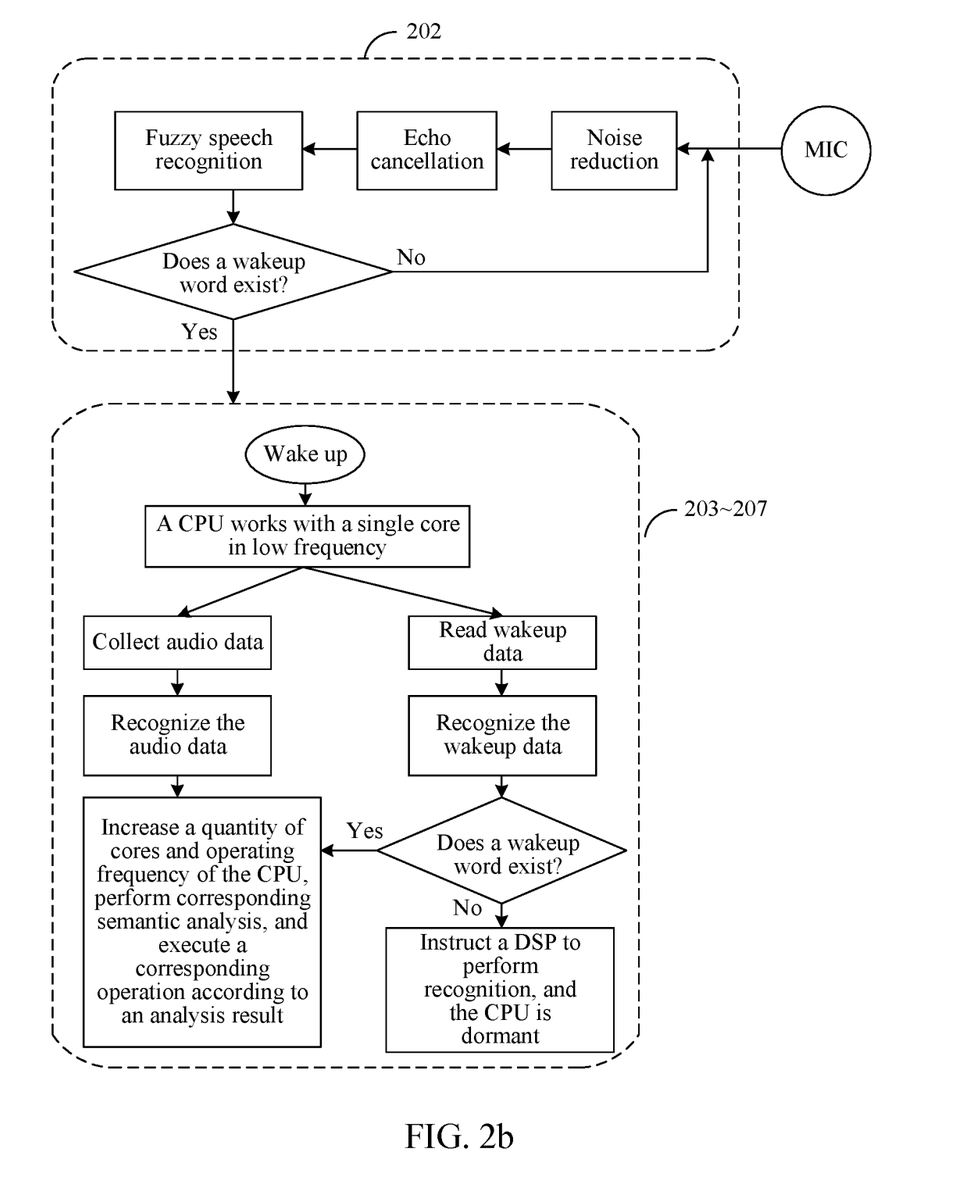
FIG. 2b is another block diagram of a speech recognition method according to an embodiment of the present disclosure.

Optionally, to improve accuracy of the speech recognition, before the fuzzy speech recognition is performed on the audio data by using the DSP, filtering such as noise reduction and/or echo cancellation may be further performed on the audio data. That is, as shown in FIG. 2b, before the operation of "performing, by the mobile terminal, fuzzy speech recognition on the audio data by using a DSP", the speech recognition method may further include:

performing, by the mobile terminal, noise reduction and/or echo cancellation processing on the audio data, to obtain processed audio data.

In this case, the operation of "performing, by the mobile terminal, fuzzy speech recognition on the audio data by using a DSP" may be specifically: performing, by the mobile terminal the fuzzy speech recognition on the processed audio data by using the DSP.

203. The DSP wakes a CPU in a dormant state up when a fuzzy speech recognition result indicates that a wakeup word exists.

For example, specifically, a running program of the CPU may be activated by the DSP. For example, specifically, a related running program specific to recording and the audio data in the CPU may be activated.

For example, that the wakeup word includes "make a call" and "send a message" is taken as an example. When a fuzzy speech recognition result indicates that the word "make a call" or "send a message" exists in the audio data, the CPU may be woken up by the DSP. The rest can be deduced by analogy.

204. The mobile terminal (e.g., CPU of the mobile terminal), reads data including the wakeup word in the audio data from the DSP, to obtain wakeup data.

For example, the wakeup word "make a call" is used as an example. If it is determined, when the DSP performs the speech recognition on an audio data segment, that a data segment A has the wakeup word "make a call" (i.e. a segment of the audio data that corresponds to the wakeup word), the mobile terminal may read the data segment A, and take the data segment A as the wakeup data.

For another example, the wakeup word "send a message" is used as an example. If it is determined, when the DSP performs the speech recognition on an audio data segment, that a data segment B has the wakeup word "send a message", the mobile terminal may read the data segment B, and take the data segment B as the wakeup data. The rest can be deduced by analogy.

205. The mobile terminal performs speech recognition on the wakeup data by using the CPU, where when a speech recognition result indicates that the wakeup word exists, operation 206 is executed; otherwise, when a speech recognition result indicates that the wakeup word does not exist (i.e., the fuzzy speech recognition result generated by the DSP about the wakeup word existing in the audio data is incorrect), the CPU is set to be dormant (i.e., the CPU enters the dormant state), and the operation of obtaining the audio data (that is, operation 201) is returned to and executed.

For example, with reference to FIG. 2b, specifically, the DSP may be instructed to execute an operation of performing the speech recognition on the audio data.

Optionally, to reduce power consumption, when the CPU is woken up, not all cores may be opened, and calculation processing is performed by using a single core in low frequency. That is, the operation of "performing speech recognition on the wakeup data by using the CPU" may include:

setting a working state of the CPU to a first state, that is, to be single-core and low-frequency, to enable the CPU to perform the speech recognition on the wakeup data in the first state.

Operations 204 and 205 are optional.

206. The mobile terminal performs semantic analysis on the audio data by using the CPU.

For example, specifically, the working state of the CPU may be set to a second state, that is, to be multi-core and high-frequency, and the CPU performs the semantic analysis on the audio data in the second state.

Optionally, to improve flexibility of processing and better balance power consumption and processing efficiency, a quantity of working cores and a magnitude of operating frequency of the CPU may be further adjusted according to a specific speech scene. For example, the mobile terminal may determine a semantic scene according to the wakeup word corresponding to the audio data, then determine the quantity of working cores and the magnitude of operating frequency of the CPU according to the semantic scene, set the working state of the CPU according to the quantity of working cores and the magnitude of the operating frequency (that is, a third state), and perform the semantic analysis on the audio data in the working state.

For example, in a semantic scene corresponding to "make a call", it is required that the quantity of working cores of the CPU is a single core, and the magnitude of operating frequency is X mhz. In a semantic scene corresponding to "send a message", it is required that the quantity of working cores of the CPU is a single core, and the magnitude of operating frequency is Y mhz. In a semantic scene corresponding to "search", it is required that the quantity of working cores of the CPU is double cores, and the magnitude of operating frequency is Z mhz. Details may be as follows:

If the wakeup word is "make a call", the quantity of working cores of the CPU may be set to a single core, and the magnitude of operating frequency may be set to X mhz. Then, the CPU performs the semantic analysis on the audio data in the working state.

If the wakeup word is "send a message", the quantity of working cores of the CPU may be set to a single core, and the magnitude of operating frequency may be set to Y mhz. Then, the CPU performs the semantic analysis on the audio data in the working state.

If the wakeup word is "search", the quantity of working cores of the CPU may be set to double cores, and the magnitude of operating frequency may be set to Z mhz. Then, the CPU performs the semantic analysis on the audio data in the working state.

The rest can be deduced by analogy.

As shown in FIG. 2b, after the CPU is woken up, the mobile terminal may further continue collecting other audio data by using the MIC. The CPU that is woken up performs the semantic analysis, and executes a corresponding operation according to an analysis result. For details of a manner of the semantic analysis and a manner of "executing a corresponding operation according to an analysis result", refer to operation 206 and operation 207. Details are not described herein.

207. The mobile terminal executes a corresponding operation according to an analysis result.

For example, an operation object and operation content may be determined according to the analysis result. Then, the operation content is executed on the operation object by using the CPU.

For example, "call Zhang San" is taken as an example. The mobile terminal may determine the operation object as "phone number of Zhang San in an address book", and the operation content is "dial the phone number". Therefore, in this case, the phone number of Zhang San in the address book may be dialed by using the CPU, thereby completing a task of "call Zhang San".

For another example, "search for poetry" is taken as an example. The mobile terminal may determine the operation object as "application of search engine", and the operation content as "search for a keyword 'poetry' by using the application of search engine". Therefore, in this case, the application of search engine in the mobile terminal may be started, and the keyword "poetry" is searched for by using the application of search engine, thereby completing a task of "search for poetry". The rest can be deduced by analogy.

It can be known from the above that in one embodiment, after the audio data is acquired, the fuzzy speech recognition may be performed on the audio data by using the DSP. Only when it is determined that the wakeup word exists, the CPU in a dormant state is woken up by the DSP. The CPU determines whether the wakeup word exists again in the working state that is single-core and low-frequency. If the CPU determines that the wakeup word does not exist, the CPU switches to a dormant state, and the DSP continues monitoring. Only when the CPU determines that the wakeup word exists, the semantic analysis is performed on the audio data by the CPU, and then a corresponding operation is performed according to an analysis result. In the scheme, the DSP with relatively low operating power consumption replaces the CPU with relatively high operating power consumption to monitor the audio data. Therefore, the CPU does not need to be always in a woken-up state, but may be in the dormant state, and is only woken up if necessary. Therefore, compared with the conventional scheme that wakeup can only be implemented by using an external power supply or a physical key, system power consumption may be greatly reduced while maintaining mobility and the speech wakeup function in the scheme, thereby prolonging the standby time of a mobile terminal and improving the performance of the mobile terminal.

In addition, in the scheme, the wakeup word may not only be recognized by the DSP, but also be recognized by the CPU again, so that accuracy of the recognition is relatively high. Moreover, when recognizing the wakeup word, the CPU enters a working state with relatively low power consumption (which is, for example, single-core and low-frequency). Only when it is determined that the wakeup word exists, the CPU performs the semantic analysis in a working state with relatively high power consumption. Therefore, use of resources is more reasonable and effective, which is conducive to further improvement in the performance of the mobile terminal.

To better implement the above method, an embodiment of the present disclosure further provides a speech recognition apparatus. The speech recognition apparatus may be specifically integrated in a mobile terminal, for example, a device such as a mobile phone, a wearable intelligent device, a tablet computer, and/or a notebook computer.

Figure 3A:
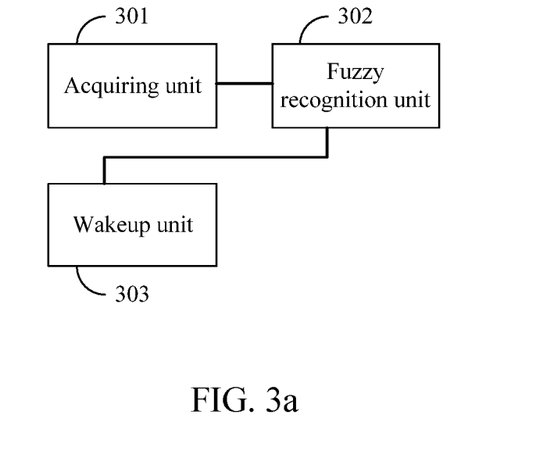
FIG. 3a is a schematic structural diagram of a speech recognition apparatus according to an embodiment of the present disclosure.

For example, with reference to FIG. 3a, the speech recognition apparatus may include an acquiring unit 301, a fuzzy recognition unit 302, and a wakeup unit 303 that are as follows:

(1) The Acquiring Unit 301

The acquiring unit 301 is configured to acquire audio data.

For example, the acquiring unit 301 may be specifically configured to collect the audio data by using an MIC, such as an MIC module built in the mobile terminal.

(2) The Fuzzy Recognition Unit 302

The fuzzy recognition unit 302 is configured to perform fuzzy speech recognition on the audio data by using a DSP.

There may be a plurality of fuzzy speech recognition manners. For example, fuzzy clustering analysis may be used for performing speech recognition on the audio data. Alternatively, a fuzzy matching algorithm may be used for performing speech recognition on the audio data. That is:

In a first manner:

The fuzzy recognition unit 302 may be specifically configured to perform, by using the DSP, speech recognition on the audio data through fuzzy clustering analysis, to obtain a fuzzy speech recognition result.

For example, the fuzzy recognition unit 302 may be specifically configured to: establish a fuzzy clustering neural network according to the fuzzy clustering analysis; predict, by taking the fuzzy clustering neural network as an estimator of a probability density function, a probability that the audio data includes the wakeup word; generate a fuzzy speech recognition result indicating that the wakeup word exists when a prediction result indicates that the probability is greater than or equal to a set value; and generate a fuzzy speech recognition result indicating that the wakeup word does not exist when the prediction result indicates that the probability is less than the set value.

The set value may be set according to an actual application requirement, and details are not described herein.

In a second manner:

The fuzzy recognition unit 302 may be specifically configured to perform, by using the DSP, speech recognition on the audio data through a fuzzy matching algorithm, to obtain a fuzzy speech recognition result.

For example, the fuzzy recognition unit 302 may be specifically configured to: acquire a feature map of a pronunciation of the wakeup word, to obtain a standard feature map; analyze a feature map of a pronunciation of each word in the audio data, to obtain a to-be-matched feature map; calculate an extent to which each to-be-matched feature map belongs to the standard feature map according to a preset membership function; generate a fuzzy speech recognition result indicating that the wakeup word exists when the extent is greater than or equal to a preset value; and generate a fuzzy speech recognition result indicating that the wakeup word does not exist when the extent is less than a preset value.

The membership function and the preset value may be set according to an actual application requirement, and details are not described herein.

Figure 3B:
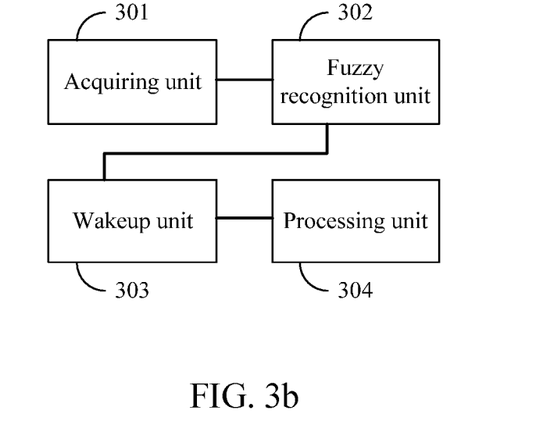
FIG. 3b is another schematic structural diagram of a speech recognition apparatus according to an embodiment of the present disclosure.

In some implementations, as shown in FIG. 3b, the speech recognition apparatus may further include a processing unit 304.

The processing unit 304 is configured to perform semantic analysis on the audio data by using the CPU, and execute a corresponding operation according to an analysis result.

For example, the processing unit 304 may be specifically configured to perform the semantic analysis on the audio data by using the CPU, determine an operation object and operation content according to the analysis result, and then execute the operation content on the operation object.

Figure 3C:
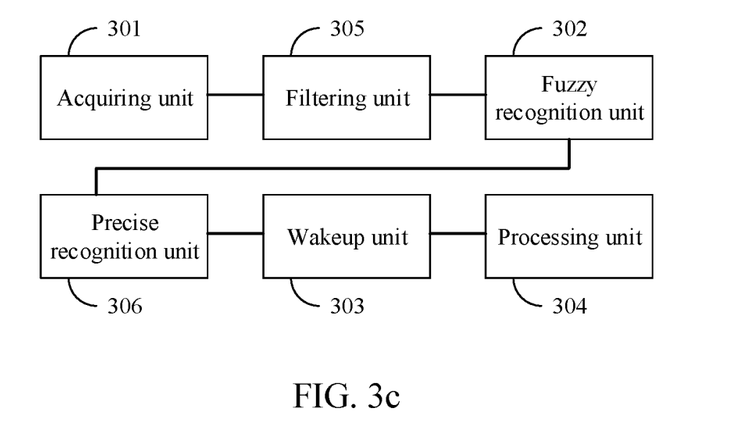
FIG. 3c is another schematic structural diagram of a speech recognition apparatus according to an embodiment of the present disclosure.

Optionally, to improve accuracy of the speech recognition, before performing the fuzzy speech recognition on the audio data, the fuzzy recognition unit 302 may further perform filtering such as noise reduction and/or echo cancellation on the audio data. That is, as shown in FIG. 3c, the speech recognition apparatus may further include a filtering unit 305 that is as follows:

The filtering unit 305 may be configured to perform noise reduction and/or echo cancellation processing on the audio data.

In this case, the fuzzy recognition unit 302 may be specifically configured to perform the fuzzy speech recognition on the audio data processed by the filtering unit 305.

(3) The Wakeup Unit 303

The wakeup unit 303 may be configured to wake the CPU in a dormant state up when a fuzzy speech recognition result indicates that a wakeup word exists.

There may be one or more wakeup words. The wakeup word may be specifically set according to an actual application requirement in advance. Details are not described herein. Optionally, to further improve the accuracy of the recognition and avoid a case that the CPU is wrongly woken up, before the processing unit 304 performs the semantic analysis on the audio data by using the CPU, the audio data may be further recognized. That is, as shown in FIG. 3c, the speech recognition apparatus may further include a precise recognition unit 306 that is as follows:

The precise recognition unit 306 may be configured to: read, from the DSP, data including the wakeup word in the audio data, to obtain wakeup data; perform speech recognition on the wakeup data by using the CPU; trigger, when a speech recognition result indicates that the wakeup word exists, the processing unit 304 to execute an operation of performing semantic analysis on the audio data by using the CPU; and when a speech recognition result indicates that the wakeup word does not exist, determines that the fuzzy speech recognition result is incorrect and set the CPU to be dormant, and trigger the acquiring unit to execute an operation of obtaining the audio data.

Optionally, to reduce power consumption, when the CPU is woken up, not all cores may be opened, and calculation processing is performed by using a single core in low frequency.

That is, the precise recognition unit 306 may be specifically configured to set a working state of the CPU to a first state, and perform the speech recognition on the wakeup data in the first state. The first state is single-core and low-frequency.

Optionally, to improve processing efficiency, when determining that the wakeup word exists, the CPU may increase a quantity of cores, and increase operating frequency to perform the semantic analysis on the audio data.

That is, the processing unit 304 may be specifically configured to set the working state of the CPU to a second state, and perform the semantic analysis on the audio data in the second state. The second state is multi-core and high-frequency.

Optionally, to improve flexibility of processing and better balance power consumption and processing efficiency, a quantity of working cores and a magnitude of operating frequency of the CPU may be further adjusted according to a specific speech scene.

That is, the processing unit 304 may be specifically configured to: determine a semantic scene according to the wakeup word corresponding to the audio data; determine a quantity of working cores and a magnitude of operating frequency of the CPU according to the semantic scene; set the working state of the CPU according to the quantity of working cores and the magnitude of the operating frequency, to obtain a third state; and perform the semantic analysis on the audio data in the third state.

During specific implementation, the foregoing units may be implemented as independent entities, or may be combined randomly and implemented as a same or several entities; for specific implementation of the foregoing units, refer to the foregoing method embodiments. Details are not described herein.

It can be known from the above that in one embodiment, after the speech recognition apparatus acquires the audio data by using the acquiring unit 301, the fuzzy recognition unit 302 may perform the fuzzy speech recognition on the audio data. Only when it is determined that the wakeup word exists, the CPU in the dormant state is woken up by the wakeup unit 303, and the CPU may be configured to perform the semantic analysis on the audio data. In the scheme, the DSP with relatively low operating power consumption replaces the CPU with relatively high operating power consumption to monitor the audio data. Therefore, the CPU does not need to be always in a woken-up state, but may be in the dormant state, and is only woken up if necessary. Therefore, compared with the conventional scheme that wakeup can only be implemented by using an external power supply or a physical key, system power consumption may be greatly reduced while maintaining mobility and the speech wakeup function in the scheme, thereby prolonging the standby time of a mobile terminal and improving the performance of the mobile terminal.

Figure 4:
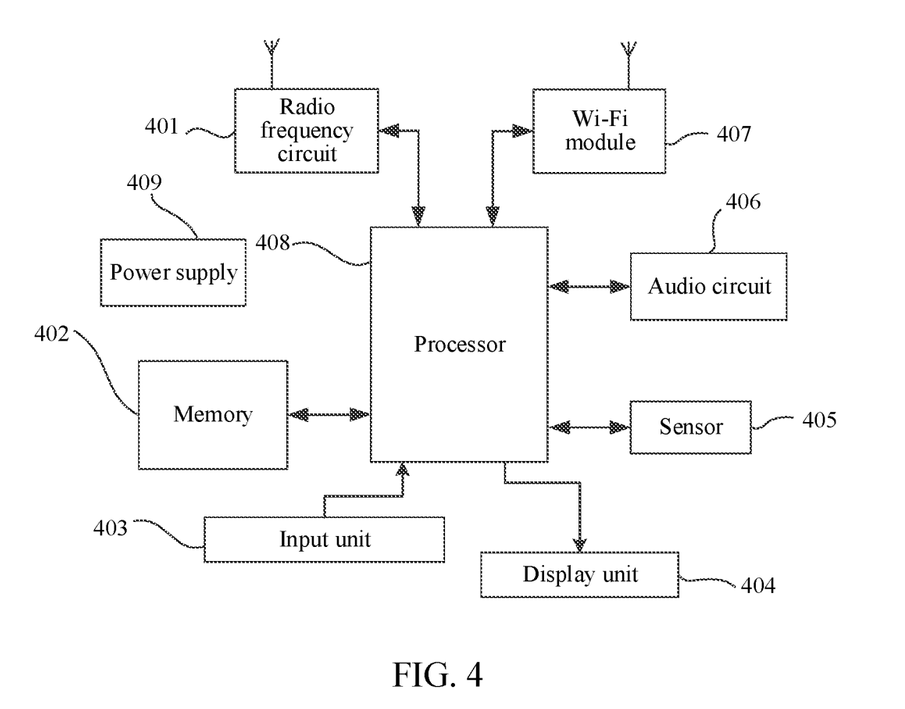
FIG. 4 is a schematic structural diagram of a mobile terminal according to an embodiment of the present disclosure.

Correspondingly, one embodiment of the present disclosure further provides a mobile terminal. As shown in FIG. 4, the mobile terminal may include components such as a radio frequency (RF) circuit 401, a memory 402 including one or more computer readable storage media, an input unit 403, a display unit 404, a sensor 405, an audio circuit 406, a wireless fidelity (Wi-Fi) module 407, a processor 408 including one or more processing cores, and a power supply 409. A person skilled in the technology may understand that the structure of the mobile terminal shown in FIG. 4 does not constitute a limitation to the mobile terminal, and the terminal may include more or fewer components than those shown in the figure, or some components may be combined, or a different component deployment may be used.

The RF circuit 401 may be configured to receive and transmit signals during an information receiving and transmitting process or a call process. Particularly, the RF circuit 401 receives downlink information from a base station, then delivers the downlink information to the one or more processors 680 for processing, and transmits related uplink data to the base station. Generally, the RF circuit 401 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 401 may communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 402 may be configured to store a software program and module. The processor 408 runs the software program and module stored in the memory 402, to implement various functional applications and data processing. The memory 402 may mainly include a program storage area and a data storage area. The program storage area may store an operating system, an application program needed by at least one function (such as an audio playback function and an image display function). The data storage area may store data (such as audio data and an address book) created according to use of the mobile terminal. In addition, the memory 402 may include a high speed random access memory, and may also include a non-volatile memory such as at least one magnetic disk storage device, a flash memory, or another volatile solid-state storage device. Correspondingly, the memory 402 may further include a memory controller, to provide access of the processor 408 and the input unit 403 to the memory 402.

The input unit 403 may be configured to: receive input digit or character information, and generate a keyboard, mouse, joystick, optical, or track ball signal input related to the user setting and function control. Specifically, in a specific embodiment, the input unit 403 may include a touch-sensitive surface and another input device. The touch-sensitive surface, which may also be referred to as a touch-screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 408. Moreover, the touch controller can receive and execute a command transmitted from the processor 408. In addition, the touch-sensitive surface may be a resistive, capacitive, infrared, or surface acoustic wave type touch-sensitive surface. In addition to the touch-sensitive surface, the input unit 403 may further include the another input device. Specifically, the another input device may include but is not limited to one or more of a physical keyboard, a function key (for example, a volume control key or a power on/off key), a trackball, a mouse, or a joystick.

The display unit 404 may be configured to display information entered by the user or information provided for the user, and various graphical user interfaces of the mobile terminal. These graphical user interfaces may be formed by a graph, a text, an icon, a video, or any combination thereof. The display unit 404 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 408 to determine a type of a touch event, and then the processor 408 provides corresponding visual output on the display panel according to the type of the touch event. Although, in FIG. 4, the touch-sensitive surface and the display panel are used as two separate parts to implement input and output functions, in some embodiments, the touch-sensitive surface and the display panel may be integrated to implement the input and output functions.

The mobile terminal may further include at least one sensor 405 such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile terminal, are not described herein again.

The audio circuit 406, a loudspeaker, and a microphone may provide audio interfaces between the user and the mobile terminal. The audio circuit 406 may convert received audio data into an electric signal and transmit the electric signal to the loudspeaker. The loudspeaker converts the electric signal into a sound signal for output. On the other hand, the microphone converts a collected sound signal into an electric signal. The audio circuit 406 receives the electric signal and converts the electric signal into audio data, and outputs the audio data to the processor 408 for processing. Then, the processor 408 transmits the audio data to, for example, another mobile terminal by using the RF circuit 401, or outputs the audio data to the memory 402 for further processing. The audio circuit 406 may further include an earplug jack, so as to provide communication between a peripheral earphone and the mobile terminal.

Wi-Fi is a short distance wireless transmission technology. The mobile terminal may help, by using the Wi-Fi module 407, the user to receive and transmit e-mails, browse a web page, access streaming media, and so on, which provides wireless broadband Internet access for the user. Although FIG. 4 shows the Wi-Fi module 407, it may be understood that the Wi-Fi module is not a necessary component of the mobile terminal, and when required, the Wi-Fi module may be omitted as long as the scope of the essence of the present disclosure is not changed.

The processor 408 is the control center of the mobile terminal, and is connected to various parts of the mobile phone by using various interfaces and lines. By running or executing the software program and/or module stored in the memory 402, and invoking data stored in the memory 402, the processor 408 performs various functions and data processing of the mobile terminal, thereby performing overall monitoring on the mobile phone. Optionally, the processor 408 may include one or more processor cores. Preferably, the processor 408 may integrate an application processor and a modem. The application processor mainly processes an operating system, a user interface, an application program, and the like. The modem mainly processes wireless communication. It may be understood that the foregoing modem processor may not be integrated into the processor 408.

The mobile terminal further includes the power supply 409 (such as a battery) for supplying power to the components. Preferably, the power supply may be logically connected to the processor 408 by using a power management system, thereby implementing functions such as charging, discharging, and power consumption management by using the power management system. The power supply 409 may further include one or more of a direct current or alternating current power supply, a re-charging system, a power failure detection circuit, a power supply converter or inverter, a power supply state indicator, and any other component.

Although not shown in the figure, the mobile terminal may further include a camera, a Bluetooth module, and the like, which are not further described herein. Specifically, in this embodiment, the processor 408 in the mobile terminal loads an executable file corresponding to one or more processes of an application to the memory 402 according to the following instructions, and the processor 408 runs an application stored in the memory 402, thereby implementing various functions:

acquiring audio data; performing fuzzy speech recognition on the audio data by using a DSP; and waking, by the DSP, a CPU in a dormant state up when a fuzzy speech recognition result indicates that a wakeup word exists, the CPU being configured to perform semantic analysis on the audio data.

After the CPU is woken up, the CPU may perform the semantic analysis on the audio data, and execute a corresponding operation according to an analysis result.

For example, specifically, the speech recognition is performed on the audio data by using fuzzy clustering analysis or a fuzzy matching algorithm. For details, refer to the foregoing embodiments. Details are not described herein.

Optionally, to improve accuracy of the speech recognition, before the fuzzy speech recognition is performed on the audio data by using the DSP, filtering such as noise reduction and/or echo cancellation may be further performed on the audio data. That is, the processor 408 may further run the application program stored in the memory 402, so as to implement the following function:

performing noise reduction and/or echo cancellation processing on the audio data, to obtain processed audio data.

Optionally, to further improve the accuracy of the recognition and avoid a case that the CPU is wrongly woken up, before the semantic analysis is performed on the audio data by using the CPU, the audio data may be further recognized by the CPU. That is, the processor 408 may further run the application program stored in the memory 402, so as to implement the following functions:

reading, from the DSP, data including the wakeup word in the audio data, to obtain wakeup data; performing speech recognition on the wakeup data by using the CPU; and executing, when a speech recognition result indicates that the wakeup word exists, the operation of performing the semantic analysis on the audio data by using the CPU; otherwise, when a speech recognition result indicates that the wakeup word does not exist, determining that the fuzzy speech recognition result is incorrect and setting the CPU to be dormant, and returning to execute the operation of obtaining the audio data.

For specific implementations of the foregoing operations, refer to the foregoing embodiments. Details are not described herein.

It can be known from the above that in one embodiment, after acquiring the audio data, the mobile terminal may perform the fuzzy speech recognition on the audio data by using the DSP. Only when it is determined that the wakeup word exists, the CPU in the dormant state is woken up by the DSP, and the CPU may be configured to perform the semantic analysis on the audio data. In the scheme, the DSP with relatively low operating power consumption replaces the CPU with relatively high operating power consumption to monitor the audio data. Therefore, the CPU does not need to be always in a woken-up state, but may be in the dormant state, and is only woken up if necessary. Therefore, compared with the conventional scheme that wakeup can only be implemented by using an external power supply or a physical key, system power consumption may be greatly reduced while maintaining mobility and the speech wakeup function in the scheme, thereby prolonging the standby time of a mobile terminal and improving the performance of the mobile terminal.

A person of ordinary skill in the art can understand that, all or some operations of various methods in the foregoing embodiments may be implemented through instructions, or implemented through instructions controlling relevant hardware, and the instructions may be stored in a computer readable storage medium and loaded and executed by a processor.

Accordingly, an embodiment of the present disclosure provides a storage medium, storing a plurality of instructions, and the instructions can be loaded by the processor, to perform the operations in any speech recognition method according to the embodiments of the present disclosure. For example, the instructions may perform the following operations:

acquiring audio data; performing fuzzy speech recognition on the audio data by using a DSP; and waking, by the DSP, a CPU in a dormant state up when a fuzzy speech recognition result indicates that a wakeup word exists, the CPU being configured to perform semantic analysis on the audio data.

After the CPU is woken up, the CPU may perform the semantic analysis on the audio data, and execute a corresponding operation according to an analysis result.

For example, specifically, the speech recognition may be performed on the audio data by using fuzzy clustering analysis or a fuzzy matching algorithm. For details, refer to the foregoing embodiments. Details are not described herein.

Optionally, to improve accuracy of the speech recognition, before the fuzzy speech recognition is performed on the audio data by using the DSP, filtering such as noise reduction and/or echo cancellation may be further performed on the audio data. That is, the instructions may further perform the following operation:

performing noise reduction and/or echo cancellation processing on the audio data, to obtain processed audio data.

Optionally, to further improve the accuracy of the recognition and avoid a case that the CPU is wrongly woken up, before the semantic analysis is performed on the audio data by using the CPU, the audio data may be further recognized by the CPU. That is, the instructions may further perform the following operations:

reading, from the DSP, data including the wakeup word in the audio data, to obtain wakeup data; performing speech recognition on the wakeup data by using the CPU; and executing, when a speech recognition result indicates that the wakeup word exists, the operation of performing the semantic analysis on the audio data by using the CPU; when a speech recognition result indicates that the wakeup word does not exist, determining that the fuzzy speech recognition result is incorrect and setting the CPU to be dormant, and returning to execute the operation of obtaining the audio data.

For specific implementations of the foregoing operations, refer to the foregoing embodiments. Details are not described herein.

The storage medium may include: a read-only memory (ROM), a random access memory (RAM), a magnetic disk, an optical disc, or the like.

Since the instructions stored in the storage medium may perform the operations of any speech recognition method according to the embodiments of the present disclosure, the instructions can implement advantageous effects that may be implemented by any speech recognition method according to the embodiments of the present disclosure. For details, refer to the foregoing embodiments. Details are not described herein.

The speech recognition method and apparatus, and the storage medium provided in the embodiments of the present disclosure are described in detail above. Although the principles and implementations of the present disclosure are described by using specific examples in this specification, the foregoing descriptions of the embodiments are only intended to help understand the method and the core idea of the method of the present disclosure. Moreover, persons skilled in the art may make modifications to the specific implementations and an application range according to the idea of the present disclosure. In conclusion, the content of the specification is not intended to be construed as a limitation on the present disclosure.

What is claimed is:

1. A speech recognition method, comprising:
    acquiring, by a digital signal processor (DSP) of a computing device, audio data;
    performing, by the DSP, fuzzy speech recognition on the audio data;
    waking up, by the DSP, a central processing unit (CPU) of the computing device in a dormant state upon determining that a wakeup word exists in the audio data based on a fuzzy speech recognition result;

reading, by the CPU, data corresponding to the wakeup word in the audio data from the DSP, to obtain wakeup data;

determining, by the CPU, whether the wakeup word exists in the audio data by performing speech recognition on the wakeup data;

upon determining that the wakeup word exists, performing, by the CPU, semantic analysis on the audio data; and upon determining that the wakeup word does not exist, determining, by the CPU, that the fuzzy speech recognition result is incorrect and entering the dormant state.

2. The method according to claim 1, wherein the performing fuzzy speech recognition on the audio data comprises:

performing, by the DSP, speech recognition on the audio data through fuzzy clustering analysis, to obtain the fuzzy speech recognition result.

3. The method according to claim 2, wherein the performing, by the DSP, speech recognition on the audio data through fuzzy clustering analysis, to obtain the fuzzy speech recognition result comprises:

establishing a fuzzy clustering neural network according to the fuzzy clustering analysis;

predicting, by taking the fuzzy clustering neural network as an estimator of a probability density function, a probability of the audio data comprising the wakeup word;

generating the fuzzy speech recognition result indicating that the wakeup word exists when the predicted probability is greater than or equal to a set value; and generating the fuzzy speech recognition result indicating that the wakeup word does not exist when the predicted probability is less than the set value.

4. The method according to claim 1, wherein the performing fuzzy speech recognition on the audio data comprises:

performing, by the DSP, speech recognition on the audio data through a fuzzy matching algorithm, to obtain the fuzzy speech recognition result.

5. The method according to claim 4, wherein the performing, by the DSP, speech recognition on the audio data through a fuzzy matching algorithm, to obtain the fuzzy speech recognition result comprises:

acquiring a feature map of a pronunciation of the wakeup word, to obtain a standard feature map;

analyzing a feature map of a pronunciation of each word in the audio data, to obtain a to-be-matched feature map;

calculating an extent to which each to-be-matched feature map belongs to the standard feature map according to a membership function;

generating the fuzzy speech recognition result indicating that the wakeup word exists when the extent is greater than or equal to a preset value; and generating the fuzzy speech recognition result indicating that the wakeup word does not exist when the extent is less than the preset value.

6. The method according to claim 1, further comprising:
after performing the semantic analysis on the audio data, and executing, by the CPU according to an analysis result of the semantic analysis, an operation corresponding to the analysis result.

7. The method according to claim 6, wherein executing an operation corresponding to the analysis result comprises:

determining an operation object and operation content according to the analysis result; and executing the operation content on the operation object.

8. The method according to claim 1, wherein the performing speech recognition on the wakeup data comprises:

setting a working state of the CPU to a first state, the first state being operating with single-core and at low-frequency; and performing the speech recognition on the wakeup data in the first state.

9. The method according to claim 8, wherein the performing the semantic analysis on the audio data comprises:

setting the working state of the CPU to a second state, the second state being operating with multi-core and at high-frequency; and performing the semantic analysis on the audio data in the second state.

10. The method according to claim 1, wherein the performing the semantic analysis on the audio data comprises:

determining a semantic scene according to the wakeup word corresponding to the audio data;

determining a quantity of working cores and an operation frequency of the CPU according to the semantic scene; and setting a working state of the CPU according to the quantity of working cores and the operation frequency, to perform the semantic analysis on the audio data.

11. The method according to claim 1, wherein before the performing fuzzy speech recognition on the audio data, the method further comprises:

performing, by the DSP, noise reduction and/or echo cancellation processing on the audio data.

12. A speech recognition apparatus, comprising:
a digital signal processor (DSP); and
a central processing unit (CPU), wherein:
the DSP is configured to:
acquire audio data;
perform fuzzy speech recognition on the audio data; and
wake up the CPU in a dormant state upon determining that a wakeup word exists in the audio data based on a fuzzy speech recognition result; and
the CPU is configured to:
read data corresponding to the wakeup word in the audio data from the DSP, to obtain wakeup data;
determine whether the wakeup word exists in the audio data by performing speech recognition on the wakeup data;
upon determining that the wakeup word exists, perform semantic analysis on the audio data; and
upon determining that the wakeup word does not exist, determine that the fuzzy speech recognition result is incorrect and enter the dormant state.

13. The apparatus according to claim 12, wherein the CPU is further configured to:

after performing the semantic analysis on the audio data, execute an operation according to an analysis result of the semantic analysis.

14. The apparatus according to claim 12, wherein the CPU is further configured to:

perform the speech recognition on the wakeup data at a first working state of single-core and low-frequency operation.

15. The apparatus according to claim 14, wherein the CPU is further configured to:

perform the semantic analysis on the audio data at a second working state of multi-core and high-frequency operation.

16. The apparatus according to claim 12, wherein the CPU is further configured to:

determine a semantic scene according to the wakeup word corresponding to the audio data;

determine a quantity of working cores and an operation frequency of the CPU according to the semantic scene; and perform the semantic analysis on the audio data in a third working state according to the quantity of working cores and the operation frequency.

17. A non-transitory computer readable storage medium storing a plurality of instructions, the instructions, when being executed by one or more processors of a computing device, cause the one or more processors to perform:

acquiring, by a digital signal processor (DSP) of the computing device, audio data;

performing, by the DSP, fuzzy speech recognition on the audio data;

waking up, by the DSP, a central processing unit (CPU) of the computing device in a dormant state upon determining that a wakeup word exists in the audio data based on a fuzzy speech recognition result;

reading, by the CPU, data corresponding to the wakeup word in the audio data from the DSP, to obtain wakeup data;

determining, by the CPU, whether the wakeup word exists in the audio data by performing speech recognition on the wakeup data;

upon determining that the wakeup word exists, performing, by the CPU, semantic analysis on the audio data; and upon determining that the wakeup word does not exist, determining, by the CPU, that the fuzzy speech recognition result is incorrect and entering the dormant state.

18. The storage medium according to claim 17, wherein the instructions further cause the CPU to:

perform the speech recognition on the wakeup data at a first working state of single-core and low-frequency operation.

19. The storage medium according to claim 18, wherein the instructions further cause the CPU to:

perform the semantic analysis on the audio data at a second working state of multi-core and high-frequency operation.

20. The storage medium according to claim 17, wherein the instructions further cause the CPU to:

determine a semantic scene according to the wakeup word corresponding to the audio data;

determine a quantity of working cores and an operation frequency of the CPU according to the semantic scene; and perform the semantic analysis on the audio data in a third working state according to the quantity of working cores and the operation frequency.

* * * * *